(12) United States Patent
Zador et al.

(10) Patent No.: US 8,085,850 B2
(45) Date of Patent: Dec. 27, 2011

(54) METHODS AND APPARATUS FOR EFFICIENT ENCODING OF IMAGE EDGES, MOTION, VELOCITY, AND DETAIL

(76) Inventors: Andrew M. Zador, Kitchener (CA); Vadim M. Kustov, Kitchener (CA); Leonard Henry Bradfield, Conestogo (CA)

(*) Notice: Subject to any disclaimer, the term of this patent is extended or adjusted under 35 U.S.C. 154(b) by 2179 days.

(21) Appl. No.: 10/831,717

(22) Filed: Apr. 26, 2004

(65) Prior Publication Data

US 2004/0213349 A1     Oct. 28, 2004

Related U.S. Application Data

(60) Provisional application No. 60/464,807, filed on Apr. 24, 2003.

(51) Int. Cl.
*H04N 7/18* (2006.01)

(52) U.S. Cl. .............................. 375/240.22; 375/240.01
(58) Field of Classification Search ... 375/240.2–240.29
See application file for complete search history.

(56) References Cited

U.S. PATENT DOCUMENTS 6,125,201 A * 9/2000 Zador ........................... 382/166
6,298,167 B1 * 10/2001 Martucci et al. .............. 382/248

* cited by examiner

*Primary Examiner* — Andy Rao

(57) ABSTRACT

A wavelet pyramid-based still-image and video compression apparatus uses line-vectors, context-dependent quantization thresholds, hierarchical tree-structured displacement coding, synchronous prediction, and conditional zerotree branch updates to improve intra- and inter-frame coding speed and efficiency, and to improve video stream noise resilience. The disclosed intra-frame coding methods can be used to improve the coding efficiency of wavelet-based still-image compression algorithms.

15 Claims, 7 Drawing Sheets

☐ Updated coefficients / pixels

Classical video compression: key frame updates all regions. Following frames depend on key frame for reconstruction.

Proposed scheme: regions update regularly, but not all in a single frame unless scene changes.

| $V_1$ |
|---|
| $V_1$ |
| $V_1$ |
| $V_1$ |
| $V_2$ |
| $V_2$ |
| $V_2$ |
| $V_2$ |

| $V_1$ |
|---|
| $V_1*6/7 + V_2*1/7$ |
| $V_1*5/7 + V_2*2/7$ |
| $V_1*4/7 + V_2*3/7$ |
| $V_1*3/7 + V_2*4/7$ |
| $V_1*2/7 + V_2*3/7$ |
| $V_1*1/7 + V_2*6/7$ |
| $V_2$ |

SMOOTH TRANSITION ↓

FIG. 5

METHODS AND APPARATUS FOR EFFICIENT ENCODING OF IMAGE EDGES, MOTION, VELOCITY, AND DETAIL

CROSS-REFERENCE TO RELATED APPLICATIONS

This application claims the benefit of PPA Ser. No. 60/464,807 filed Apr. 24, 2003.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to an apparatus capable of compressing motion picture and still-images. It improves coding efficiency (compressibility), increases coding/decoding speed and improves noise resilience of resulting compressed video streams. When properly implemented in a lossy wavelet-based video or still-image codec, it reduces the size of the bit-stream required for transmitting and/or storing video and still-image material at a given quality, or increases the quality of the reconstructed image at a given bit budget. The part of the invention designed for intra-frame compression is equally applicable to coding individual frames of a video sequence and to coding still images. The proliferation of digital television and the transmission of multimedia content over the Internet have created the need for better video and still image compression methods. Older video compression standards such as MPEG-1, MPEG-2, and H.261 are being replaced by newer standards such as H.263+, MPEG-4, and H.264 (also known as AVC, MPEG-4 part 10) primarily to provide better picture quality at a smaller bit budget. The arrival of high definition television (HDTV) broadcast and the ever-increasing demand for higher resolution, greater bit-depth, and multi-spectral digital pictures are creating the need for compression methods whose performance improves with increasing picture size.

Typically, well-designed pyramid-structured codecs have better intra-frame coding efficiencies than those of block-based video codecs such MPEG, H.261, H.264, etc. (or block-based still image standards such as JPEG) for higher resolution material.

The present invention improves the intra-frame coding efficiency of a wavelet- or similar filter-based codec, and provides methods for improving inter-frame coding efficiency, speed, and resilience to noise.

In the present invention, which employs a zerotree in a transform pyramid, velocity information is embedded along the nodes in a zerotree structure, allowing for sparser representation of motion fields and the description of affine motions (e.g. rotations, changes of scale, morphing etc.) not permitted in block motion algorithms. Consequently, the encoder encodes motion information only about changes in the movement of edges present in a multiresolution structure. Edges are one-dimensional sparse structures, and describing the motions of edges is an efficient approach compared with describing the motion of each pixel. Because affine motions such as rotation, skewing, morphing, and zooming may be handled by edge-motion descriptions, motion-compression can be more efficiently encoded in this manner than by block motions alone. This is important, since two-dimensional scene motion often contains zoom and rotation, and 2-D projection of 3-D real-world motion often contains morphing components (e.g. a face turning away from the camera). The velocity information at finer scales of the zerotree refines the velocity information of the finer scale tree components from the coarser scale information. If only a low-resolution version of a video sequence needs to be decoded, the unnecessary higher resolution velocity refinement information is discarded saving computational resources.

During transmission in a noisy environment (e.g. "over-the-air" terrestrial broadcast, satellite broadcast, etc.), noise often corrupts compressed video streams. Classical video compression methods encode certain frames as still images. These frames are decoded independently from any other frames and are called key-frames (or "I-frames" due to their independence). In classical video compression, in order to provide a high coding efficiency, the majority of frames in a video sequence are encoded as differences with respect to one or more reference frames. In MPEG parlance, these frames are referred to as "P" or "B" frames, for "Predicted" or "Bi-directionally predicted" frames. Without adequate error protection, if a short noise burst corrupts a key-frame, it has also corrupted those subsequent P and B frames dependent upon this particular key-frame as a reference frame from which the P or B frame is predicted for reconstruction. In classical MPEG type video transmission systems, a certain degree of noise resilience is achieved by combining the compressed video stream with forward error correction, in a context-independent manner (i.e. each bit in the compressed video stream receives an equal amount of error protection regardless of the importance of the visual information carried by that bit). In this mode of error protection, a most-significant bit (MSB) in the DC term (i.e. representing the average luminance or color) of an entire DCT block carries no more protection than a least-significant bit (LSB) in the highest frequency component. Because errors in the average luminance or color of entire blocks can result in a half-second or more of seriously damaged video, while errors in a refinement value for a small group of pixels may go unnoticed, the forward error correction applied in such a context-independent manner cannot provide optimal visual quality at a given error correction bit budget, since worst-case protection will apply too many error correction bits for the high-frequency LSBs, and best-case protection will permit large-scale, highly visible damage. According to the present invention the still-image update information is spread among several frames. Thus, the key-frames are replaced by frames containing key-regions (with the exception of scene changes, which can be addressed differently), that is, regions in a frame that are encoded independently from other frames. According to this encoding scheme, a short-lived noise event will only corrupt a region of a scene, without propagating through its contemporary frame, and if the forward error correction bit-budget is distributed in an hierarchical manner, i.e. coarser scales of the transform pyramid receive more error correction bits than finer scales, uncorrected erroneous data would more likely occur in the finer scales, resulting in a small blur of the reconstructed scene. This method results in more efficient use of the available error correction bit-budget.

Motion prediction is a crucial part of modern video compression algorithms. A classical encoder estimates motion vectors for the current frame using previous and future frames. The decoder cannot accomplish the same operation, since neither the current frame (the frame for which motion estimation is being performed) nor future frames are available at the decoder at that time.

According to the present invention, the encoder performs a different type of motion estimation—one where it assumes that the current frame is not available. It then estimates motion vectors (displacement) based on the frames that are currently available to the decoder. The decoder performs the identical operation. Since the encoder and the decoder perform identical operations on the same data in a synchronous fashion, they arrive at the same motion vector estimates, and these estimates need not be transmitted to the decoder. This synchronous type of motion estimation improves compression by not sending the motion vector data, and could provide an extra amount of noise resilience, since in the absence of transmission, motion vectors cannot be corrupted by transmission noise. Vector quantization (VQ) can provide a significant coding gain over scalar quantization by exploiting existing correlations among elements of a data set (e.g. the wavelet transform of an image). Typically, in vector quantization, an image (or its transform) is divided into square (or rectangular) block vectors. These blocks then form the input vectors to the vector quantizer. The output vectors of the vector quantizer usually form a sparse codebook containing the centroids of the input data set found by the vector quantizer, or, alternatively, a pre-selected, generally optimal codebook. If a pre-selected codebook is used, it can be stored at the decoder in advance, otherwise, the codebook of centroids, calculated in real-time at the encoder is transmitted to the decoder instead of all of the original vectors. In the reconstructed image the original vectors are replaced by their respective centroids.

In the present invention the decoder may perform additional operations on the received centroids. The procedures required to be performed on the vectors may either be known to the decoder or supplied to it by the encoder. The instruction regarding the type(s) of procedures needing to be performed on the vectors by the decoder can be supplied as pointers to procedures, and possibly their arguments, embedded in a zero-tree structure. This reuse of centroids is most effective if the vectors are defined as line-vectors (i.e. vectors that have spatial dimensions of one pixel in one axis by one or more pixels in the other axis, as opposed to block vectors). These line-vectors are taken from the un-subsampled (wavelet) transform to avoid shift-variance introduced by decimation. An example of the advantages offered by the present invention is in the encoding of an oblique homogeneous edge in an image. As the edge crosses square or rectangular regions, vectors representing those regions will be dissimilar and would require several centroids to accurately approximate the edge crossings at different locations. These block vectors are over-constrained with respect to the data they must compactly approximate. According to the present invention, one line-vector may be used to represent the coefficients along a homogeneous edge crossing at a particular location in a subband, and the same vector with accurate shift information (and/or a minor adjustment in one or more coefficients) may represent several of the subsequent edge crossings in that subband efficiently.

In order to reduce the execution time required for decoding of line-vectors, a method is provided here to avoid unnecessary recalculation (convolution) of line-vectors during the reconstruction of an image. Line-vectors in a high-pass band typically undergo transformations similar to the corresponding line-vectors representing the same location in the image in the corresponding low-pass band, and for highly similar linear image data on subsequent lines and in a particular band and orientation, the resulting line-vectors would differ from one-another exclusively by a shift requiring sub-pixel representation accuracy (and that shift could possibly be zero). If the encoder determines that this type of relationship exists, it inserts a representative symbol encoding "re-use this line-vector, applying specified shifts" into the bit-steam. Upon encountering this symbol, the decoder performs the convolution only once, and then repeats the result on the subsequent lines of the image. (Here, "lines" of the image refers to the filter orientation applied to the image data for generating a particular subband, and can be of either orientation.) By avoiding multiple convolution operations, execution time is significantly reduced.

If the data set is sufficiently de-correlated, vector quantization does not benefit from large vector sizes. In this case, vectors containing very few elements (and possibly just one element) are used. In the context of the wavelet transform of an image, this can occur at all scales of the transform if the input image already consists of de-correlated pixel content of the image, or at higher (coarser) scales for most images due to the de-correlating properties of the wavelet transform. A common approach to quantizing this type of data is to compare coefficient values against a threshold. If the amplitude of a coefficient has exceeded the threshold, it becomes significant. When representing edges, this technique often results in discontinuous representations of continuous edges, because a typical edge, which undergoes gradual changes in luminance and chrominance along its length, in the wavelet domain is represented by coefficients of varying amplitudes that reflect those changes. Larger amplitude wavelet coefficients along the edge are kept, while smaller coefficients become approximated by zeros (in scalar quantization, known as the deadband). Upon reconstruction, a continuous edge becomes a discontinuous edge. In the present invention, the problem of preserving continuity in edges is solved by testing the wavelet coefficients' amplitudes within a subband against two different thresholds to determine their significance. If a coefficient's amplitude exceeds the larger threshold it becomes significant. If a coefficient's amplitude exceeds the smaller test-threshold, further testing is done to determine its significance. A test is performed to determine significance of any coefficient whose absolute amplitude falls between the smaller and larger thresholds. If any adjacent, neighboring wavelet coefficient has exceeded the larger threshold or if any adjacent, neighboring coefficient has been found to be significant by one or more of its neighbors' amplitudes, then the current coefficient is tagged as significant.

Further objects and advantages will become apparent from a consideration of the ensuing description and drawings.

BRIEF SUMMARY OF THE INVENTION

Accordingly, an object of the present invention is the reduction of the amount of data needed to describe an image and any motion occurring over time within an image sequence, by encoding a video sequence in a scale pyramid structure, by describing scene motion (or luminance change in the case of a position-static image) as an hierarchical motion (or luminance difference) zerotree with parent-to-child refined information, as well as sibling-refined information in the scan order sequence within a subband of a pyramid transform, embedded in the data stream along with zerotree symbols, in the case of a motion-predicted frame subsequent to a compressed key-frame, and by describing motions in subsequent non-key motion-zerotree frames before the occurrence of the next key frame as differences from the previous motion-zerotree frame.

It is another object of the present invention to increase video stream resilience to noise events by eliminating key-frames in the absence of scene change events, and updating different static regions of a scene as branches of a zerotree, within different frames of a sequence, and by applying hierarchical forward error correction, both according to the visual importance of the data in the compressed bit stream.

A further object of the present invention is the reduction of the amount of data needed to reconstruct a frame by sending the difference between the original (unquantized) value of a zero-tree node and its value synchronously predicted by the encoder and decoder, using the information currently available at the decoder.

Another object of the present invention is the reduction of the amount of data needed to represent a still image, by providing a method for efficient re-use of line-vectors representing specific, spatially structured groups of coefficient values.

Another object of the present invention is the reduction of execution time required for decoding, by avoiding recalculation (convolution) of sufficiently similar data undergoing similar transformations.

A further object of the present invention is the improved versatility of the encoding/decoding system by allowing the embedding of values, and pointers to scene structures and procedures at the nodes of a zerotree structure.

An additional object of the present invention is the improved reconstructed image quality afforded by preserving continuity in object edges within a scene, by using multiple, scene-context based quantization thresholds.

The present invention is a part of a wavelet-based image or video compression codec. It may be implemented in any appropriate mixture of software and hardware.

BRIEF DESCRIPTION OF THE DRAWINGS

The present invention will become better understood with reference to the accompanying drawings, which are given by way of illustration and should not be construed to limit the scope of the invention.

FIG. 5 illustrates classical transition from one vector type to another as applied to line-vectors. On the left, at a given point along the edge, the vector centroid changes suddenly. On the right, (by example only) a linear interpolation is shown between two different types of line-vector.

DETAILED DESCRIPTION OF THE INVENTION

In a preferred embodiment of the invention, the encoder compares the coefficients of the wavelet transform of an original frame with the corresponding coefficients obtained (predicted) using frames available to the decoder. The encoder and decoder use identical information for predictions and are synchronous in their predictions. If the encoder determines that a particular (luminance or chrominance) coefficient value in the quantized still-image transform of the current frame is closer to the real value than the predicted coefficient for the current location, then it encodes the quantized still-image wavelet coefficient value to replace the less accurate predicted value or alternatively encodes performs classical motion compensation for the current frame and encodes the difference between the classical motion vectors and the synchronously predicted motion vectors. Thus, the decoder reconstructs some of the wavelet coefficients based on this new information, and the rest of the wavelet coefficients based on the velocity information from the previous frame(s) and the most recent still-image value to have undergone the motions resulting from the velocity history, (with the exception of a scene change, where all the coefficients are reconstructed based on new spatial information, and a branch change, where a branch of zerotree coefficients is reconstructed based on new spatial information).

Figure 1:
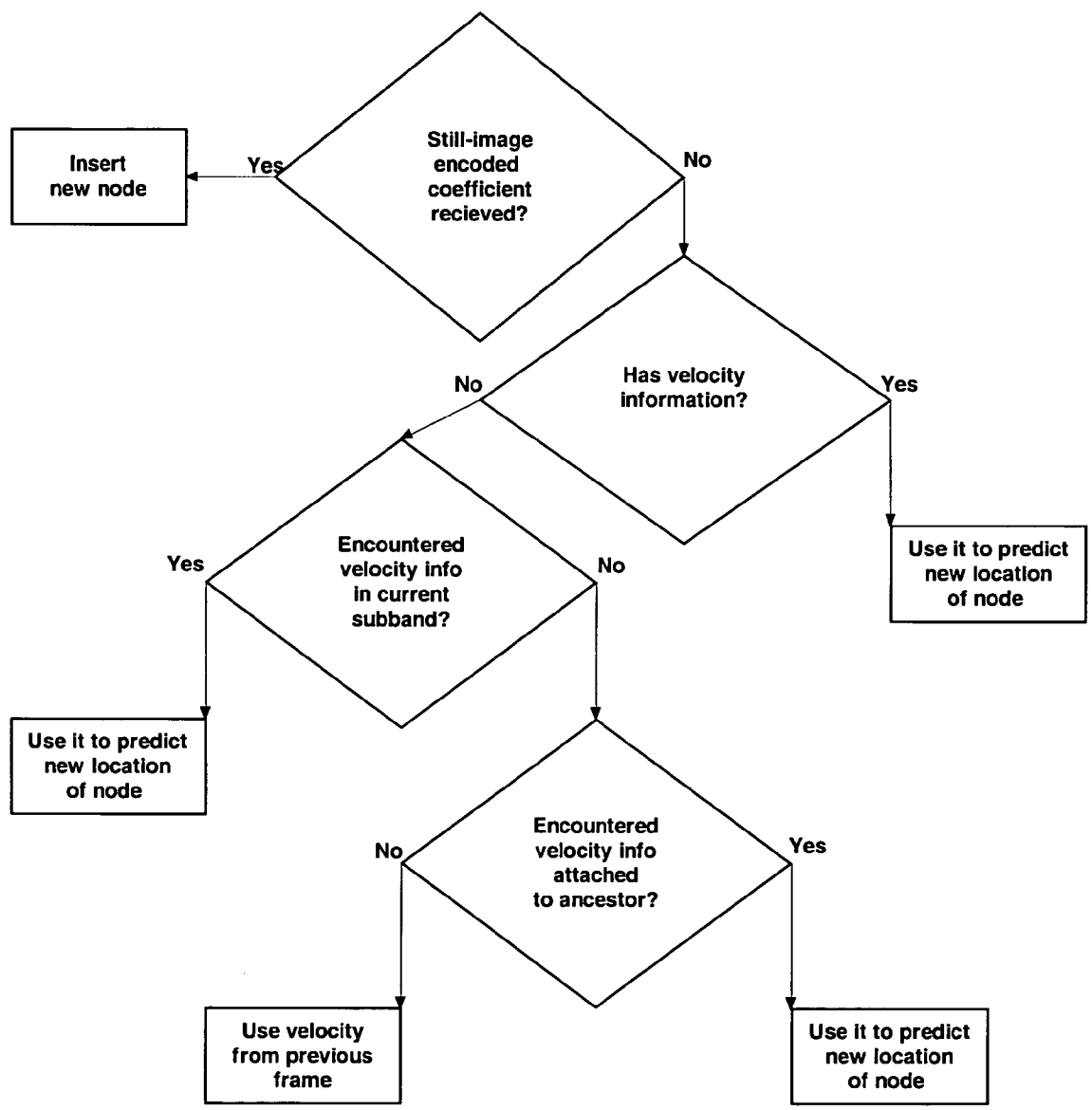
FIG. 1 is a flowchart showing the hierarchy of the decisions in the algorithm, which embeds velocity information along the nodes in a zerotree structure.
Figure 2:
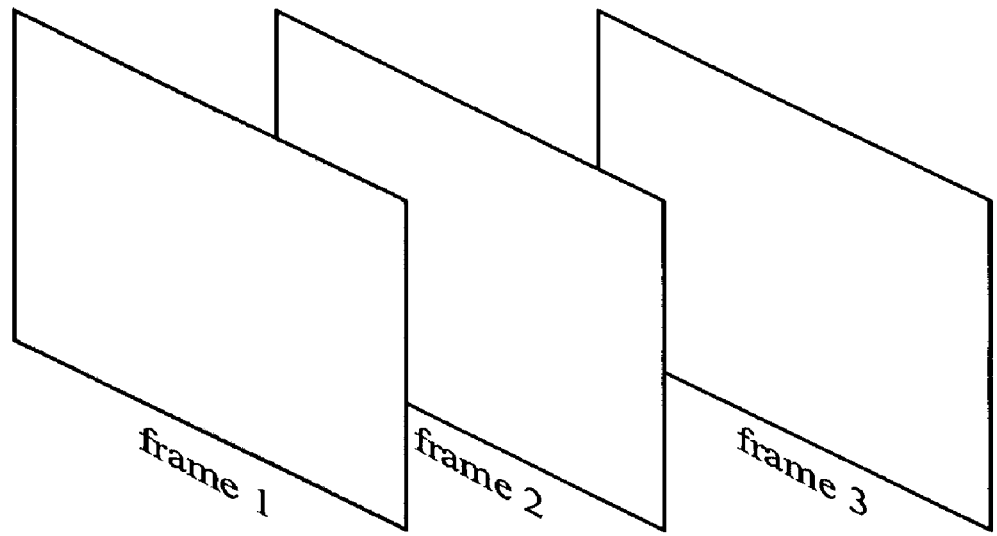
FIG. 2 illustrates the difference between a classical (e.g. MPEG) video compression process (top), where a key-frame (referred to commonly in MPEG as an I-frame) periodically updates all image regions simultaneously as one new compressed still-image, from which successive frames are motion-coded, and the proposed method (bottom), where (except in the case of a scene change) different image regions are periodically updated in a staggered fashion (as pyramid branches), with each frame updating different regions of the still-image.
Figure 2:
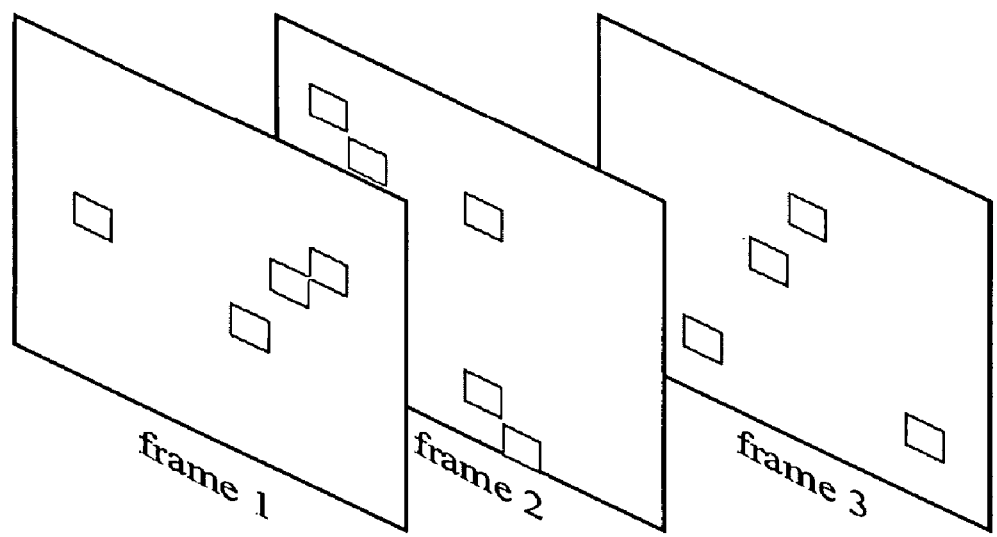

In a preferred embodiment of the invention, still-images do not need to be updated simultaneously in their entirety, in contrast with most video compression methods, which require a complete still-image (key-frame) to be encoded at given intervals. Different regions in the scene represented by different wavelet coefficients representing a branch of the zerotree, may be updated with different frames (see FIG. 2). As should be obvious to one skilled in the art, with the exception of scene changes (where the entire image is different from the previous frame), specific regions within a video frame do not need to be updated in any particular frame, and can be updated when entropy-budget permits or when motion cannot be predicted in the specific region. Regions may be updated in order of their visibility (refinement), or inversely to the order of their predictability from adjacent regions. If a short-lived noise event (with sufficient power to corrupt a frame in a classical video compression scheme) has corrupted a key-frame, then one or more entire frames that rely on this key frame for reconstruction will be corrupted as well.

If hierarchical error protection is applied to the present invention (i.e. coarser wavelet transform levels receive more protection than finer levels), then the same noise burst will most likely result in a blur at the finest scale of a small region instead of damage or loss of an entire block with visible multiple-frame persistence. This is because the majority of the coefficients in the image pyramid represent the finest scales, so a random noise event in time has a much higher likelihood of disrupting fine-scale data. As well, the coarser scale blocks can be protected by much more error correction data (as a percentage of block size) than the fine-scale blocks, and at lower bit budget, given the smaller data size at progressively coarser scales. The current invention allows for a more uniform bit-rate, since (except for scene changes) no specific frame has to receive more error protection or encode more information, and thus avoids sudden jumps in entropy of the data stream. The only constraint on updating, is that every image region must be updated within a reasonable maximum frame count to ensure that the entire scene is visible within an acceptable time after beginning acquisition (e.g. turning on the television or recorder). In a preferred embodiment of the present invention, the encoder and decoder use identical information and procedures to predict node values, and are synchronous in their predictions. Since the encoder and decoder perform identical operations on the same data, they must arrive at the same motion vector estimates, and these estimates need not be transmitted to the decoder.

A preferred embodiment of the present invention employs vector quantization, performed using line-vectors in un-sub-sampled subbands. Line-vectors represent areas which are one coefficient high by one to several wide, or one coefficient wide by one to several high, as opposed to block or rectangular vectors which are several coefficients long in both axes.

The encoder operates in undecimated subbands in a predetermined direction (i.e. horizontal or vertical). In a preferred embodiment, in the first step, it finds the locations of such zero-crossings that the absolute difference between the elements adjacent to the zero-crossing in this predetermined direction exceeds some predetermined threshold.

Figure 3:
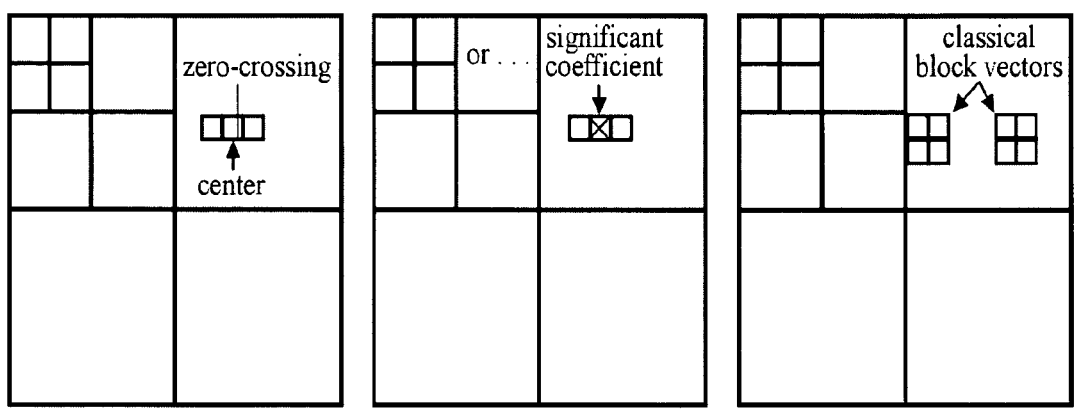
FIG. 3 illustrates the location of line-vectors in a transform pyramid. Such line-vectors would normally be analyzed in undecimated transform space. Line-vectors are shown positioned either by the zero-crossing between the largest differential pair of coefficients with sub-pixel accuracy (on the left), or by the most significant coefficient (center). Such positioning is illustrated as not being useful for quality improvement or entropy reduction when applied to block-vectors (right) because of the over-constrained nature of square or rectangular vector structures.
Figure 4:
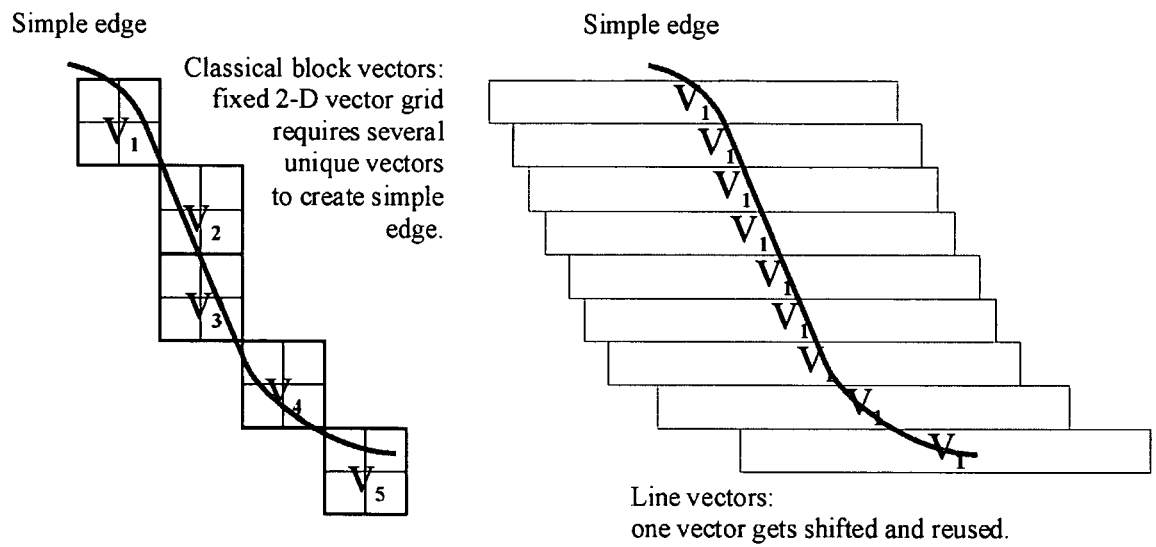
FIG. 4 illustrates the disadvantage of applying block-vectors to image-data. The block vectors on the left are shown to be spatially fixed by their geometry, and several different vectors are shown to be required to describe the simple edge in the image. On the right, the single one-dimensional line-vector type is illustrated as describing an extent of the edge by including accurate offsets (along the long dimension of the vector) as part of the description.

In another embodiment, the locations of zero-crossings are nearest to the coefficients that have been found to be significant by a scalar quantizer. The exact location of such a zero-crossing is defined to be the center of a line vector, and a line vector itself is defined as a predetermined number of wavelet coefficients (the length of the vector) on both sides of the zero-crossing in the same predetermined direction, (see FIG. 3). In another embodiment, the center of a line-vector is defined as the geometric center of the first occurrence of a maximum difference between adjacent coefficients along the line-vector as scanned from the left horizontally, or the top vertically, to avoid ambiguity in cases where the quantized vector has multiple identical amplitude differences along its length, and where the maximum difference does not actually cross zero. In the second step, a clustering algorithm, (such as LBG, K-means, ALC-VQ, etc. as will be known to those skilled in the art), is used to find centroids and to create a codebook, similar to typical vector quantization techniques. Scan lines crossing a homogeneous oblique-angled object edge segment in the image can now be represented by a common line-vector in the codebook with a unique offset distance in the long axis of the vector. A pointer in a zerotree indicates the codebook vector and appropriate offset distance. The locations of adjacent identical vectors on adjacent scan lines are stored as shifts. It should be apparent to one skilled in the art, that block vectors cannot be used in the described fashion to provide any advantages over classical vector quantization methods (see FIG. 4).

The reconstruction can be performed by either inserting the undecimated vectors from the codebook into an undecimated subband, or by appropriately decimating them first, and then inserting them into a decimated subband.

In a preferred embodiment the encoder analyzes within a subband, whether there is a smooth transition in successive scan lines crossing an edge in the image, from one vector to a similar but slightly different vector. If this is the case the encoder flags the two centroids with a different special symbol indicating this condition. When the decoder encounters this symbol, it interpolates or performs a similar smoothing or predicting operation on those vectors located between the two flagged vectors (see FIG. 5). This technique allows for more accurate reconstruction of non-homogeneous edges, typically characterized by smooth transition along the edge. This technique also permits the use of a sparser codebook, since those line-vectors whose structure may be predicted by the bracketing explicitly defined line-vectors, and situated between them, may be omitted from the codebook. This process also allows for a sparser zerotree pointer structure, because those scan lines occurring between such linked line-vectors in a subband can now eliminate their pointers to the codebook.

Figure 6:
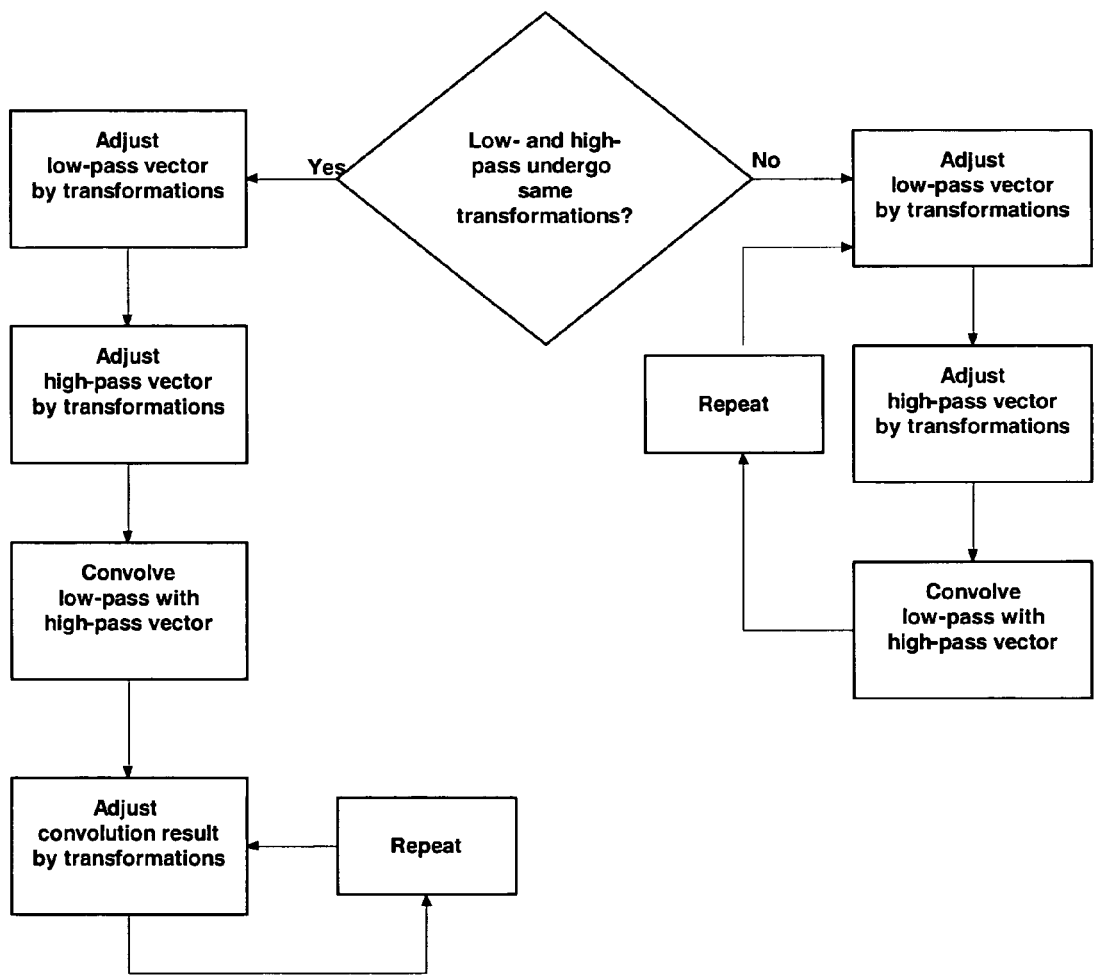
FIG. 6 is a flowchart showing a general algorithm for avoiding recalculation (convolution) of low- and high-pass line vectors. In the main right branch the recalculation (convolution) cannot be avoided and the algorithm convolves each pair of low- and high-pass vectors. In the main left branch the convolution is only performed on the first pair of vectors. After that the algorithm uses the result of the first convolution instead of convolving each subsequent pair of vectors, thus saving execution time.

In the present invention the encoder determines the pairs of high- and corresponding low-pass vectors for which spatial transformations (such as shifts, decrease or increase in magnitude, etc.) are the same. For such case the encoder inserts a symbol indicating that the specified high-pass and low-pass line-vector pair are prototypes. The decoder, upon encountering this symbol, reconstructs (convolves) the first pair of high-pass and low-pass vectors and then proceeds by repeating the result (with shifts or other received transformation parameters) on the subsequent specified scan lines, (see FIG. 6). In the absence of this technique, the decoder would have to recalculate (convolve) these pairs of vectors for every subsequent line of their occurrence. By avoiding recalculation (convolution) of pairs of vectors at subsequent lines a saving in execution time is achieved at the decoder.

In a preferred embodiment of the present invention, a zerotree node which carries part of the information needed to reconstruct a region has an option of having a pointer which points to some procedure, and a further option of encoding an argument or a pointer to it, to be used by the procedure. The decoder either already stores locally, or receives procedure(s) from the encoder. Upon encountering a pointer to a procedure, the decoder either applies the procedure to the node that contains the pointer, or if the node also contains a pointer to an argument, applies the argument to the procedure and the node. This results in an increased versatility of the encoding/decoding system. In an image or video representing natural scenes many regions either within one frame or in different frames can be represented by one region that has undergone some transformation such as shift, zoom, rotation, increase/decrease in magnitude, etc. Therefore, upon reconstructing a region, the decoder can reuse this region, by applying appropriately transforming this region to represent other regions.

Since classical zerotree coding segregates different types of data by stream (i.e. sign/amplitude stream, zerotree symbol stream), and points to them from the zerotree structure to aid compression, extending this concept to other data sets (such as motion) containing similar data/procedure types, with possibly similar values and ranges, should enable more efficient compression than the same data transmitted unsorted.

In the present invention, the encoder tests the wavelet coefficients' amplitudes within a subband against two different thresholds to determine their significance.

Figure 7:
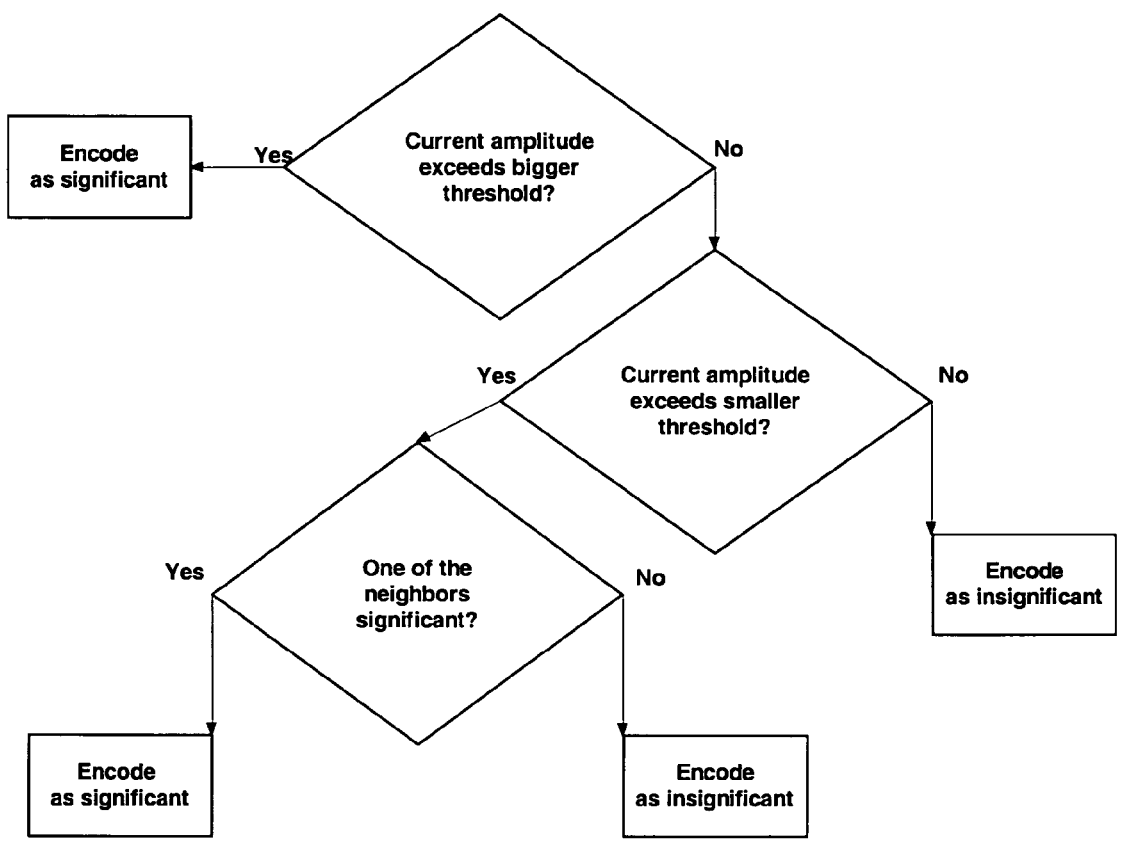
FIG. 7 is a flowchart showing an algorithm that helps to preserve continuity in edges. The "current amplitude" refers to the wavelet coefficient's magnitude, which is being analyzed by the encoder.

If a coefficient's amplitude exceeds the larger threshold it becomes significant. If a coefficient's amplitude exceeds the smaller threshold, further testing is done to determine its significance. A test is performed to determine significance of any coefficient whose amplitude falls between the smaller and larger thresholds. If one of the adjacent wavelet coefficients has exceeded the larger threshold or if one of the adjacent coefficients has been found to be significant as a result of the significance of its neighbors, then the current coefficient is tagged as significant. The flowchart of this procedure is shown in FIG. 7.

This technique results in better preservation of continuity in edges. A typical edge, which undergoes gradual changes in luminance and chrominance along its length, is represented by coefficients (in the wavelet domain) of varying amplitudes, reflecting those changes. In a classical wavelet compression schemes, coefficients in a particular subband are compared against a threshold. If they exceed the threshold they become significant. When representing edges, this technique often results in discontinuous representations of continuous edges. Larger amplitude wavelet coefficients along the edge are kept, while smaller coefficients get approximated by zeros. Upon reconstruction, a continuous edge becomes a discontinuous edge. In the case of faint edges, only parts of a previously continuous edge remain visible. In the case of stronger edges, parts of a sharp continuous edge in the original image retain their sharpness, while other segments of the edge get blurred due to the fact that the coefficients at the finer scales which contributed to sharpness have been approximated by zeros.

Although some of the above descriptions are fairly specific, they should not be construed as limiting the scope of the present invention but as illustrations of some preferred embodiments of it. The present invention should be interpreted more broadly, and as defined in the appended claims.

We claim:

1. The reduction of information to be transmitted in a still picture, a frame of a video sequence, or a motion-zerotree frame, by performing vector quantization on the data using line-vectors, noting each line-vector's center positional offset with respect to the current zerotree node as measured along the length of the line vector, where similarity in the image or motion-field from line to line in a subband, along the direction of line vectors would enable efficient, compact encoding.

2. The method according to claim 1, wherein the alignment of the line-vector is based upon the location of such inflection or zero-crossing that the absolute difference between the elements adjacent to the inflection or zero-crossing along the direction of the line-vector is a maximum for the coefficients along the line vector. The exact location of such zero-crossing or center of the inflection magnitude maximum shall be defined to be the center of said line-vector.

3. The method according to claim 2, wherein, if there are multiple identical absolute differences between adjacent coefficients along a line vector, then the first maximum difference from the left of horizontal vectors (or the top of vertical vectors) shall be defined as the center of the line-vector.

4. The method according to claim 1, wherein line-vectors may be made efficiently encodable in a line-vector codebook, by use of a clustering algorithm on the transform data, to find centroids and neighbors, encoding differences between neighboring centroids efficiently, such as by tree-structuring of said neighboring vectors within the codebook.

5. The method according to claim 1, wherein a pointer within a zerotree structure indicates both the line-vector to be applied at the current location and orientation, and the appropriate offset distance from the center of the coefficient being addressed in the zerotree to the center of the line vector.

6. The method according to claim 1, wherein, within a subband, when there is sufficient similarity between line-vectors on several adjacent lines (ignoring center-offset differences), the tree coefficients bracketing the start and end of such group of line-vectors may be tagged by special zerotree symbols indicating this condition to the decoder, allowing a smooth interpolation along the edge encoded by that segment of the zerotree structure by the decoder, thus permitting reduced encoding entropy.

7. The method according to claim 1, whereby the problem of preserving continuity in edges is addressed by testing transform coefficients' amplitudes within a subband against two different thresholds to determine their significance such that if a coefficient's amplitude exceeds the larger threshold it becomes significant and if a coefficient's amplitude exceeds the smaller threshold, then further testing is done to determine its significance by testing whether any adjacent transform coefficients have exceeded the larger threshold or been found to be significant on their own otherwise, whereby the current coefficient is then also tagged as significant (See FIG. 7).

8. The method according to claim 1 wherein, by appropriately segregating different types of data such as luminance or motion by stream, and pointing to the streams from within the zerotree, streams containing similar data and/or procedure types with possibly similar values and ranges, may be more efficiently compressed than the same data transmitted in an unsorted manner.

9. The reduction of information to be transmitted in a video sequence encoded in a scale pyramid structure, by describing scene motion (or luminance/color change in the case of a spatially static image) as an hierarchical motion (or luminance difference) zerotree with parent-to-child refined information, as well as prior sibling-refined information in the scan order sequence within a subband of a pyramid transform, embedded as pointers to the motion (or luminance/color change) data stream from the zerotree, in the case of a motion-predicted frame following a compressed key-frame, and by describing motions in subsequent non-key motion-zerotree frames before the occurrence of the next key frame as differences from the previous motion-zerotree frame.

10. The method according to claim 9 wherein further reduction of information is accomplished by synchronous prediction of the elements of the next motion zerotree frame at the encoder and decoder, allowing for the transmission of only the differences between actual and synchronously predicted motions along the subsequent motion zerotree.

11. The method according to claim 9, wherein, if the encoder determines that a particular (luminance or chrominance) coefficient value in the quantized still-image transform of the current frame is closer to the real value than the predicted coefficient for the current location, then it encodes the quantized still-image wavelet coefficient value to replace the less accurate predicted value.

12. The method according to claim 9, wherein changes in a luminance or chrominance datum for either a moving or static location may be transmitted as luminance or chrominance side-information embedded in the motion-zerotree.

13. The method according to claim 9, whereby large data stream entropy variations may be smoothed by periodically updating the various branches of the still-image zerotree in a staggered timetable, based upon the various branch entropies, their visibility, and bandwidth currently available in the data stream, for those branches not experiencing unpredictable scene change, instead of transmitting an entire key-frame all at once.

14. The method according to claim 13, wherein, by use of a multiple-frame delay at the encoder, unpredictable scene change branches may be transmitted as additional side information, in advance of their frame to reduce the transmission entropy required at scene changes.

15. The method according to claim 9, wherein hierarchical forward error protection is applied to the image- or motion-pyramid, such that coarse scale scene- or motion-information information receives more error protection than finer-scale information, thereby improving the probability of higher perceived reception quality.

* * * * *